(12) United States Patent
Tomita et al.

(10) Patent No.: US 12,012,501 B2
(45) Date of Patent: Jun. 18, 2024

(54) RESIN COMPOSITION FOR ACOUSTIC MATCHING LAYER

(71) Applicant: NISSHINBO HOLDINGS INC., Tokyo (JP)

(72) Inventors: Hideshi Tomita, Chiba (JP); Takashi Suzuki, Okazaki (JP); Yoshitaka Saito, Ota-ku (JP); Nana Isomoto, Chiba (JP)

(73) Assignee: NISSHINBO HOLDINGS INC., Tokyo (JP)

( * ) Notice: Subject to any disclaimer, the term of this patent is extended or adjusted under 35 U.S.C. 154(b) by 579 days.

(21) Appl. No.: 17/288,286

(22) PCT Filed: Sep. 27, 2019

(86) PCT No.: PCT/JP2019/038207
§ 371 (c)(1),
(2) Date: Apr. 23, 2021

(87) PCT Pub. No.: WO2020/110445
PCT Pub. Date: Jun. 4, 2020

(65) Prior Publication Data
US 2021/0388179 A1    Dec. 16, 2021

(30) Foreign Application Priority Data
Nov. 27, 2018  (JP) .................................. 2018-221481

(51) Int. Cl.
| | |
|---|---|
| *C08K 7/28* | (2006.01) |
| *B06B 1/00* | (2006.01) |
| *C08G 59/18* | (2006.01) |
| *C08G 59/24* | (2006.01) |
| *C08G 59/68* | (2006.01) |
| *C08K 3/36* | (2006.01) |
| *C08K 7/22* | (2006.01) |
| *C08L 63/00* | (2006.01) |
| *C08L 101/12* | (2006.01) |
| *G10K 11/02* | (2006.01) |
| *H04R 17/00* | (2006.01) |

(52) U.S. Cl.
CPC .............. *C08K 7/28* (2013.01); *C08G 59/184* (2013.01); *C08G 59/245* (2013.01); *C08G 59/686* (2013.01); *C08K 3/36* (2013.01); *C08K 7/22* (2013.01); *C08L 63/00* (2013.01); *C08L 101/12* (2013.01); *G10K 11/02* (2013.01); *B06B 1/00* (2013.01); *C08K 2201/005* (2013.01); *C08K 2201/006* (2013.01); *H04R 17/00* (2013.01)

(58) Field of Classification Search
CPC .............. C08K 7/28; C08K 3/36; C08K 7/22; C08K 2201/005; C08K 2201/006; C08G 59/184; C08G 659/686; C08G 59/245; C08L 101/12; C08L 63/00; B06B 1/00; G10K 11/02; H04R 17/00
See application file for complete search history.

(56) References Cited

U.S. PATENT DOCUMENTS

| | | | | |
|---|---|---|---|---|
| 5,981,610 A | * | 11/1999 | Meguriya | ................ C08K 7/22 521/154 |
| 2011/0305787 A1 | * | 12/2011 | Ishii | ....................... G11B 5/855 425/385 |
| 2012/0065516 A1 | * | 3/2012 | Nishikubo | ........... H10N 30/098 600/459 |
| 2013/0133408 A1 | | 5/2013 | Lang | |

FOREIGN PATENT DOCUMENTS

| | | | |
|---|---|---|---|
| JP | 11-215594 A | | 8/1999 |
| JP | 2003-143685 | * | 5/2003 |
| JP | 2003-143685 A | | 5/2003 |
| JP | 2004-083761 | * | 3/2004 |
| JP | 2005-130389 A | | 5/2005 |
| JP | 2006-174992 A | | 7/2006 |
| WO | WO 99/15578 | * | 4/1999 |
| WO | WO 2017/109620 | * | 6/2017 |

OTHER PUBLICATIONS

Machine English translation of JP 2003-143685, Ogita, May 2003.*
Machine English translation of JP 2004-083761, Ogisu, Mar. 2004.*
International Search Report issued in PCT/JP2019/038207 (PCT/ISA/210), dated Dec. 3, 2019.

* cited by examiner

*Primary Examiner* — Patrick D Niland
(74) *Attorney, Agent, or Firm* — Birch, Stewart, Kolasch & Birch, LLP

(57) ABSTRACT

The present invention provides a resin composition for an acoustic matching layer which maintains uniform dispersibility of a hollow filler, can suppress bubble trapping, and is excellent in moldability and handleability. The resin composition for an acoustic matching layer, comprises a resin, a hollow filler, and a thixotropy imparting agent, wherein the resin composition has a viscosity measured using a B-type viscometer with rotor No. 4 at a rotation speed of 0.3 rpm at 25° C. of 1130 to 4000 Pa·s, and has a thixotropy index expressed by the ratio (V1/V2) between a viscosity (V1) measured using a B-type viscometer with rotor No. 4 at a rotation speed of 0.3 rpm and a viscosity (V2) measured using a B-type viscometer with rotor No. 4 at a rotation speed of 1.5 rpm, at 50° C., of 3.0 to 5.0.

6 Claims, No Drawings

RESIN COMPOSITION FOR ACOUSTIC MATCHING LAYER

TECHNICAL FIELD

The present invention relates to a resin composition for an acoustic matching layer, which is a molding material for an acoustic matching layer in an ultrasonic sensor.

BACKGROUND ART

The ultrasonic sensor can detect foreign matter and gas and can measure distance, flow rate, concentration, and the like by receiving ultrasonic waves propagating through a subject with a piezoelectric vibrator and measuring changes in propagation time and frequency of the ultrasonic waves. Therefore, ultrasonic sensors are utilized in various industrial fields.

The ultrasonic sensor is configured such that an acoustic matching layer having an acoustic impedance intermediate between the piezoelectric vibrator and the subject is interposed between the piezoelectric vibrator and the subject, thereby improving the transmission efficiency of the ultrasonic wave and improving the detection sensitivity.

In an ultrasonic sensor used as a gas sensor, in order to improve the efficiency of transmission and reception of ultrasonic waves, the acoustic matching layer is required to have a low density, and is formed using, for example, a material in which a hollow filler is mixed with a resin.

For example, PTL 1 describes a method of producing an acoustic matching layer by injecting a resin mixed with a hollow glass balloon into a mold, and heat curing and molding the resin under pressure.

CITATION LIST

Patent Literature

PTL 1: JP 2003-143685 A

SUMMARY OF INVENTION

Technical Problem

The hollow glass balloon (hollow filler) in the acoustic matching layer needs to be uniformly dispersed in the acoustic matching layer from the viewpoint of improving the acoustic characteristics of ultrasonic waves.

However, since the hollow filler has a smaller specific gravity than the resin, the hollow filler floats in the resin composition before curing, and the resin composition tends to become compositionally non-uniform over time.

In order to solve this problem, it is considered that the viscosity of the resin composition is increased to suppress compositional non-uniformity. However, since the fluidity is decreased, the load of kneading the resin composition is increased, and air mixed in the resin composition remains even after curing, so-called bubble trapping is likely to occur. In addition, the hollow filler is likely to be cracked or crushed due to an increase in compressive load or shear load applied to the hollow filler by kneading.

In addition, according to the production method described in PTL 1, it is said that an acoustic matching layer in which hollow glass balloons are uniformly distributed with less bubble trapping is obtained by molding by heat curing under pressure, but there is a case where bubbles compressed and trapped by pressure molding remain, and such compressed bubbles adversely affect acoustic characteristics. Furthermore, the hollow glass balloon may be broken by pressure molding.

Therefore, as a material for an acoustic matching layer formed of a resin comprising a hollow filler, there is a demand for a resin composition which is excellent in uniform dispersibility of the hollow filler, has little bubble trapping, and is excellent in moldability and handleability.

The present invention has been made to solve the above-mentioned problems, and an object of the present invention is to provide a resin composition for an acoustic matching layer which maintains uniform dispersibility of a hollow filler, can suppress bubble trapping, and is excellent in moldability and handleability.

Solution to Problem

The present invention is based on the finding that in a resin composition for an acoustic matching layer comprising a resin and a hollow filler, by imparting thixotropy (thixotropic property), floating of the hollow filler is suppressed at a predetermined viscosity and a predetermined thixotropy index (hereinafter also referred to as a TI value), bubble trapping is suppressed, and moldability is improved.

That is, the present invention provides the following [1] to [6].

[1] A resin composition for an acoustic matching layer, comprising a resin, a hollow filler, and a thixotropy imparting agent, wherein the resin composition has a viscosity measured using a B-type viscometer with rotor No. 4 at a rotation speed of 0.3 rpm at 25° C. of 1130 to 4000 Pa·s, and has a thixotropy index expressed by the ratio (V1/V2) between a viscosity (V1) measured using a B-type viscometer with rotor No. 4 at a rotation speed of 0.3 rpm and a viscosity (V2) measured using a B-type viscometer with rotor No. 4 at a rotation speed of 1.5 rpm, at 50° C., of 3.0 to 5.0.

[2] The resin composition for an acoustic matching layer as set forth in [1] above, wherein the resin is a thermosetting resin, and the thermosetting resin has a viscosity measured using a B-type viscometer with rotor No. 4 at a rotation speed of 0.3 rpm at 25° C. of 2 to 50 Pa·s.

[3] The resin composition for an acoustic matching layer as set forth in [2] above, wherein the thermosetting resin is an epoxy resin.

[4] The resin composition for an acoustic matching layer as set forth in any one of [1] to [3] above, wherein the thixotropy imparting agent is a powder having a BET specific surface area of 50 to 400 $m^2/g$.

[5] The resin composition for an acoustic matching layer as set forth in any one of [1] to [4] above, wherein the thixotropy imparting agent is a hydrophilic silica powder.

[6] The resin composition for an acoustic matching layer as set forth in any one of [1] to [5] above, wherein the hollow filler has a particle diameter of 1 to 100 μm.

Advantageous Effects of Invention

According to the present invention, it is possible to obtain a resin composition for an acoustic matching layer, which maintains uniform dispersibility of a hollow filler, can suppress bubble trapping, and is excellent in moldability and handleability. By using the resin composition for an acoustic matching layer, it is possible to easily form an acoustic matching layer having excellent compositional uniformity and less bubble trapping.

DESCRIPTION OF EMBODIMENTS

The resin composition for an acoustic matching layer (hereinafter also simply referred to as a resin composition) of the present invention comprises a resin, a hollow filler, and a thixotropy imparting agent. The resin composition is characterized by having a viscosity (hereinafter also referred to as "V0") measured using a B-type viscometer with rotor No. 4 at a rotation speed of 0.3 rpm at 25° C. of 1130 to 4000 Pa·s, and having a TI value expressed by the ratio (V1/V2) between a viscosity (V1) measured using a B-type viscometer with rotor No. 4 at a rotation speed of 0.3 rpm and a viscosity (V2) measured using a B-type viscometer with rotor No. 4 at a rotation speed of 1.5 rpm, at 50° C., of 3.0 to 5.0.

According to the resin composition having such viscosity and thixotropy, uniform dispersibility of the hollow filler is maintained, bubble trapping is suppressed, and moldability and handleability are favorable.

Viscosity

The viscosity of each of the resin composition and the resin in the present invention is a value [unit: Pa·s] of viscosity measured by using a B-type viscometer with rotor No. 4.

Viscosity (V0)

The resin composition has a viscosity (V0) of 1130 to 4000 Pa·s, preferably 1140 to 3500 Pa·s, and more preferably 1150 to 3000 Pa·s at a rotation speed of 0.3 rpm at 25° C.

The viscosity (V0) is a viscosity at a low shear rate at 25° C. after kneading the blending components of the resin composition, and can be regarded as the viscosity of the resin composition in a static storage state at normal temperature before molding.

When the viscosity (V0) is less than 1130 Pa·s, it is difficult to suppress the floating of the hollow filler in the resin composition obtained by kneading, and the resin composition tends to be compositionally non-uniform. On the other hand, when the viscosity (V0) exceeds 4000 Pa·s, the shear load applied during kneading of the blending components of the resin composition becomes large, and the hollow filler is likely to be cracked or crushed.

TI value (V1/V2)

In the present invention, the TI value of the resin composition is expressed by the ratio (V1/V2) between the viscosity (V1) at a rotation speed of 0.3 rpm at 50° C. and the viscosity (V2) at a rotation speed of 1.5 rpm at 50° C.

The viscosity (V1) is a viscosity at a low shear rate in a state in which the resin composition is heated from normal temperature to 50° C., and can be regarded as a viscosity in a state in which the heated resin composition is left to stand immediately before molding.

The viscosity (V2) is a viscosity at a shear rate higher than that at the time of measurement of the viscosity (V1) in a state in which the resin composition is heated from normal temperature to 50° C., and can be regarded as a viscosity in a fluid state when the heated resin composition is cast at the time of molding.

The TI value is a ratio between the viscosity (V1) and the viscosity (V2), and represents thixotropy at 50° C., and serves as an index relating to the moldability of the resin composition and the handleability at the time of molding.

The TI value of the resin composition is 3.0 to 5.0, preferably 3.1 to 4.9, and more preferably 3.2 to 4.8.

When the TI value is less than 3.0, the fluidity of the resin composition at the time of molding is high, and handling becomes difficult such as dripping, and the resin composition tends to be compositionally non-uniform.

On the other hand, when the TI value is more than 5.0, bubble trapping tends to occur during casting at the time of molding, and molding failure tends to occur. It is considered that this is because local variations in the fluidity of the resin composition are likely to occur.

The viscosity (V1) is lower than the viscosity (V0) at 25° C., and is preferably 300 to 1500 Pa·s, more preferably 350 to 1400 Pa·s, and still more preferably 400 to 1300 Pa·s, from the viewpoint of maintenance of uniform dispersibility and ease of handling when molding the resin composition.

The viscosity (V2) is lower than the viscosity (V1), and is preferably 90 to 270 Pa·s, more preferably 100 to 260 Pa·s, and still more preferably 110 to 250 Pa·s, from the viewpoint of suppression of bubble trapping during molding of the resin composition, filling properties into a mold, and the like.

Resin

As the resin which is a blending component of the resin composition, a resin which makes the resin composition have the above-described viscosity and thixotropy is used, and a thermosetting resin is preferable from the viewpoint of heat resistance and the like.

Examples of the thermosetting resin include an epoxy resin, a phenol resin, a urea resin, a melamine resin, an unsaturated polyester resin, a polyurethane resin, a silicone resin, and an acrylic resin. The thermosetting resin may be used alone or may be used in combination of two or more thereof. Among these, epoxy resins are preferably used because they are excellent in heat resistance, chemical resistance, electrical insulation, adhesiveness, and the like.

The thermosetting resin preferably has a viscosity of 2 to 50 Pa·s, more preferably 5 to 40 Pa·s, and still more preferably 10 to 30 Pa·s, as measured using a B-type viscometer with rotor No. 4 at a rotation speed of 0.3 rpm at 25° C.

According to the resin having such a viscosity, since the viscosity at normal temperature is relatively low, the miscibility with the hollow filler and the thixotropy imparting agent is excellent, and even in the case where bubble trapping occurs during kneading of the blending components of the resin composition, defoaming becomes easy.

Although a resin having a high viscosity can suppress the floating of the hollow filler in the resin composition and can maintain the uniformity of the composition, the hollow filler is likely to be cracked or crushed due to an increase in shear load applied to the hollow filler during kneading of the blending components of the resin composition. In addition, it is preferable to use a resin having a low viscosity as described above because fluidity is too low during casting at the time of molding or bubble trapping cannot be sufficiently suppressed in some cases.

When the viscosity is 2 Pa·s or more, floating of the hollow filler is easily suppressed. In addition, when the viscosity is 50 Pa·s or less, the load at the time of kneading of the blending components of the above-mentioned resin composition does not become too large, and the moldability and handleability of the resin composition tend to be good.

The amount of the resin is preferably 40 to 85 parts by mass, more preferably 45 to 80 parts by mass, and still more preferably 50 to 75 parts by mass, based on 100 parts by mass of the total amount of the resin, the hollow filler, and the thixotropy imparting agent, which are essential blending components of the resin composition, from the viewpoints of sufficient mechanical strength of a molded article obtained from the resin composition, compositional uniformity of the resin composition, and the like.

Hollow Filler

The hollow filler is added to the resin composition from the viewpoint of uniformly reducing the density of the resin composition. The hollow filler may be an inorganic hollow filler or an organic hollow filler as long as it can maintain a hollow particle shape in the resin composition. Examples thereof include a glass balloon, a fly ash balloon, a silica balloon, an alumina balloon, a zirconia balloon, and a resin balloon. The hollow filler may be used alone or may be used in combination of two or more thereof. Among these, a glass balloon is preferably used from the viewpoint of heat resistance, durability, and the like. It is also preferable to use a resin balloon from the viewpoint of further reducing the density of the resin composition and impact resistance.

The hollow filler preferably has a particle diameter in the range of 1 to 100 μm, more preferably 2 to 95 μm, and still more preferably 5 to 90 μm.

When the particle diameter is 1 μm or more, the hollow filler has an appropriate surface area and good miscibility with the resin, and a molded article obtained using the resin composition can have sufficient mechanical strength. In addition, when the particle diameter is 100 μm or less, the hollow filler is less likely to be cracked or crushed due to stress during kneading of the blending components of the resin composition, which is preferable.

The particle diameter can be measured by a laser diffraction method.

The apparent density of the hollow filler is preferably 0.02 g/cm$^3$ or more and less than 1.00 g/cm$^3$, more preferably 0.05 to 0.80 g/cm$^3$, and still more preferably 0.10 to 0.50 g/cm$^3$, from the viewpoint of reducing the density of the resin composition and maintaining the shape of hollow particles of the hollow filler.

The apparent density in the description herein refers to a particle density including voids (hollow portions) in particles, and can be measured by a constant volume expansion method.

The blending amount of the hollow filler in the resin composition is appropriately set according to the type of the resin, the desired density, and the like, but is preferably 10 to 50 parts by mass, more preferably 15 to 45 parts by mass, and still more preferably 20 to 40 parts by mass with respect to 100 parts by mass of the total of the blending components other than the hollow filler and the thixotropy imparting agent in the resin composition, from the viewpoint of good moldability and handleability of the resin composition.

Thixotropy Imparting Agent

The thixotropy imparting agent is added to the resin composition in order to adjust the thixotropy as described above, and has an effect of suppressing floating of the hollow filler in the resin composition to maintain uniform dispersibility, and suppressing bubble trapping of the resin composition. Even when a resin having a low viscosity is used, an appropriate viscosity is exhibited by the thixotropy imparting agent during molding, and the compositional uniformity of the resin composition is maintained. In addition, the blending components of the resin composition can be kneaded in a state of relatively low viscosity, and the shear load applied to the hollow filler during kneading does not become large, and the handleability of the resin composition becomes favorable.

The thixotropy imparting agent is preferably a powder having a BET specific surface area of 50 to 400 m$^2$/g, and the BET specific surface area is more preferably 70 to 380 m$^2$/g, and still more preferably 100 to 350 m$^2$/g.

When the BET specific surface area is 50 m$^2$/g or more, it is easy to obtain thixotropy suitable for suppressing floating of the hollow filler and uniformly dispersing the thixotropy imparting agent. When the BET specific surface area is 400 m$^2$/g or less, the thixotropy imparting agent can obtain good miscibility with the resin, and the resin composition is preferable for maintaining the compositional uniformity.

The BET specific surface area can be measured by a static volumetric method (three-point method) using nitrogen gas as an adsorbate according to JIS Z 8830:2013.

The powder preferably has an apparent density larger than that of the hollow filler from the viewpoint of imparting thixotropy to the resin composition comprising the hollow filler. The apparent density of the thixotropy imparting agent powder is preferably 1.00 to 4.30 g/cm$^3$, more preferably 1.10 to 3.00 g/cm$^3$, and still more preferably 1.20 to 2.50 g/cm$^3$.

Examples of the thixotropy imparting agent include powders such as fumed silica, fumed titanium oxide, carbon, and cellulose nanofibers. The thixotropy imparting agent may be used alone or may be used in combination of two or more thereof. Among these, the thixotropy imparting agent is selected and used according to the type of the resin, and for example, when the resin is an epoxy resin, hydrophilic silica, particularly hydrophilic fumed silica, is preferably used.

The content of the thixotropy imparting agent in the resin composition is appropriately set depending on the type, viscosity, and the like of the resin. From the viewpoint of imparting good thixotropy, the content is usually preferably 0.1 to 5.0 parts by mass, more preferably 0.2 to 4.0 parts by mass, and still more preferably 0.3 to 3.0 parts by mass, with respect to 100 parts by mass of the total of the blending components other than the hollow filler and the thixotropy imparting agent in the resin composition.

Other Components

The resin composition may comprise components other than the resin, the hollow filler, and the thixotropy imparting agent as optional components within a range that does not impair the effects of the present invention.

Other than the other components in the resin composition, that is, the total content of the resin, the hollow filler, and the thixotropy imparting agent is preferably 50 to 99% by mass, more preferably 60 to 98% by mass, and still more preferably 70 to 97% by mass.

Examples of the other components include a curing agent, a silane coupling agent, and a colorant. These components may be used alone or may be used in combination of two or more thereof.

When the resin is an epoxy resin, examples of the curing agent include an aliphatic polyamine, an aromatic amine, a polyamide resin, an imidazole compound, and a mercaptan compound.

Examples of the silane coupling agent include a vinyl silane compound, an epoxy silane compound, a styryl silane compound, a methacrylic silane compound, an acrylic silane compound, an amino silane compound, and a mercapto silane compound. When the resin is an epoxy resin, an epoxy silane compound such as 3-glycidoxypropyltriethoxysilane or an amino silane compound is preferably used.

The resin composition of the present invention is used for an acoustic matching layer of an ultrasonic sensor, and in particular, can be suitably used for molding an acoustic matching layer of an ultrasonic sensor that emits ultrasonic waves in the air in order to measure the flow velocity, flow rate, concentration, spatial distance, and the like of a gas.

Production Method of Resin Composition for Acoustic Matching Layer

The method for producing the resin composition for an acoustic matching layer of the present invention is not particularly limited, and the resin composition can be obtained by blending and kneading the above-mentioned blending components of the resin composition.

The order of addition when blending the blending components is also not particularly limited, and the blending components may be simultaneously blended and kneaded. It is also preferable that the hollow filler, which may be cracked or crushed during kneading, is added later in consideration of the load applied by kneading.

The kneading of the blending components can be performed using a known kneader, stirrer, mixer, or the like, such as kneading with a roll mill, a kneader, or the like, stirring with a rotary blade, stirring with a planetary stirring mixer, or the like.

In addition, from the viewpoint of suppressing bubble trapping, it is preferable to perform defoaming under reduced pressure during kneading. The resin composition has good defoaming due to defoaming under reduced pressure.

When the resin composition for an acoustic matching layer for a gas sensor as mentioned above is produced, for example, an epoxy resin is preferably used as the resin, and the resin composition is preferably produced by the following method.

First, an epoxy resin, a curing agent and hydrophilic fumed silica are blended and kneaded. Then, hydrophilic silica as a thixotropy imparting agent and a glass balloon are added thereto and kneaded, and further kneading is continued under reduced pressure and defoaming is performed to obtain a resin composition.

According to such a production method, it is possible to suitably obtain a resin composition for an acoustic matching layer in which bubble trapping is suppressed, the glass balloon does not float, and the compositional uniform distribution can be maintained.

The reduced pressure at the time of the defoaming may be a vacuum degree that can be achieved by a general vacuum defoaming machine, and the normal allowable vacuum degree is 1 Torr (about 133 Pa).

Acoustic Matching Layer Molded Article

The method for producing an acoustic matching layer molded article produced using the resin composition is not particularly limited, but it is preferable to produce the molded article by, for example, casting the resin composition in a predetermined mold in a state where the resin composition has appropriate thixotropy, that is, at about 50° C. having the TI value, and then heating and curing the resin composition. The heating temperature is appropriately set according to the curing temperature of the resin used.

When the acoustic matching layer molded article is cut out from the cured body of the resin composition and subjected to molding processing, the hollow filler is likely to be cracked or crushed. Therefore, the acoustic matching layer molded article is preferably molded by casting in a mold prepared in advance in accordance with the shape and size of a desired acoustic matching layer molded article.

For example, when the ultrasonic sensor including the acoustic matching layer molded article is a gas sensor for detecting so-called light gas such as hydrogen gas or helium gas, the acoustic matching layer molded article preferably has a density (25° C.) of 0.20 to 0.80 g/cm$^3$, more preferably 0.25 to 0.75 g/cm$^3$, and still more preferably 0.30 to 0.70 g/cm$^3$.

The acoustic characteristics of the acoustic matching layer molded article can be evaluated by, for example, sound velocity, transmission voltage, or the like.

When the acoustic matching layer molded article is for a gas sensor as described above, the sound velocity (25° C.) of the molded article is preferably 2200 to 3100 m/s, more preferably 2300 to 3000 m/s, and still more preferably 2400 to 2900 m/s. The transmission voltage of the molded article is preferably 10.0 V or more, more preferably 12.0 V or more, and still more preferably 15.0 V or more because the higher the transmission voltage, the smaller the transmission decay.

EXAMPLES

Hereinafter, the present invention will be described in detail with reference to Examples, but the present invention is not limited thereto.

Production of Resin Composition

The details of the blending components of the resin compositions produced in the following Examples and Comparative Examples are as follows.

Resin

Epoxy resin (1): "jER (registered trademark) 828", manufactured by Mitsubishi Chemical Corporation, bisphenol A type, viscosity (25° C., rotation speed 0.3 rpm) 12 Pa·s Epoxy resins (2): "EPICLON (registered trademark) EXA-835LV", manufactured by DIC Corporation, bisphenol F type, viscosity (25° ° C., rotation speed 0.3 rpm) 2.3 Pa·s Epoxy resin (3): a mixture of 80% by mass of epoxy resin (1) and 20% by mass of epoxy resin (2), viscosity (25° C., rotation speed 0.3 rpm) 8.9 Pa·s Hollow Filler Glass balloon: hollow glass beads, "Sphericel (registered trademark) 25P45", manufactured by Potters-Ballotini Co., Ltd., particle diameter 15 to 75 μm, apparent density 0.25 g/cm$^3$ Thixotropy Imparting Agent Hydrophilic silica (1): fumed silica, "AEROSIL (registered trademark) 200", BET specific surface area of about 200 m$^2$/g, apparent density 2.10 g/cm Hydrophilic silica (2): fumed silica, "AEROSIL (registered trademark) 300", BET specific surface area of about 300 m²/g, apparent density 2.10 g/cm

Other Blending Components

Curing agent: an epoxy adduct type imidazole compound, "Novacure (registered trademark) HX-3742", manufactured by Asahi Kasei Corporation Silane coupling agent: 3-glycidoxypropyltriethoxysilane, "KBM-403", manufactured by Shin-Etsu Chemical Co., Ltd.

Example 1

75 parts by mass of the epoxy resin (1), 22 parts by mass of the curing agent, and 3 parts by mass of the silane coupling agent were kneaded with a planetary stirring mixer for 5 minutes to obtain a kneaded product.

To this kneaded product, 0.5 parts by mass of the hydrophilic silica (1) was added as a thixotropy imparting agent, and 29 parts by mass of glass balloon as a hollow filler was further added thereto and kneaded. Then, kneading under reduced pressure of 1 Torr by a vacuum pump was continued for 20 minutes, followed by defoaming to obtain a resin composition.

Examples 2 to 6 and Comparative Examples 1 to 3

Each resin composition was produced in the same manner as in Example 1 except that the blending components of the resin composition shown in each of Examples 2 to 6 and Comparative Examples 1 to 3 in Table 1 below were used.

Measurement Evaluation

With respect to each of the resin compositions obtained in the above Examples and Comparative Examples, the following various measurements and evaluations were performed. The results of these evaluations are summarized in Table 1 below.

Viscosity 400 mL of the resin composition was placed in a 500 mL beaker, and the viscosities (V0, V1 and V2) of the resin composition were measured using a B-type viscometer ("TVB-25L", manufactured by Toki Sangyo Co., Ltd.) with rotor No. 4 at the measurement temperature and rotation speed shown below.

V0: 25° C., 0.3 rpm
V1: 50° C., 0.3 rpm
V2: 50° C., 1.5 rpm
Table 1 also shows the TI value (=V1/V2).

Dispersibility Evaluation 200 mL of the resin composition was placed in a plastic container having a diameter of 65 mm and a height of 90 mm, and left at 25° C. for 1 week. Then, about 5 g of the resin composition in the plastic container within a range (upper part) from the upper surface to a depth of 10 mm was scooped up with a spatula, and the taken-out resin composition was cured in an oven at 150° C. for 30 minutes. The volume and mass after cooling to room temperature (25° C.) were measured, and the upper density was calculated. Further, after removing the resin composition in the upper part and the central part (between the upper part and the lower part) in the plastic container with a spatula, about 5 g of the resin composition within a range (lower part) from the bottom part of the container to a height of 10 mm was scooped up with a spatula and the lower density was determined in the same manner as the upper density.

Table 1 shows the upper density and the lower density.

It can be said that the smaller the difference between the upper density and the lower density, the better the uniform dispersibility of the resin composition.

In the dispersibility evaluation of Table 1, a case where the difference between the upper density and the lower density is 5% or less of the upper density is indicated as "A" and a case where the difference exceeds 5% is indicated as "B".

Bubble Trapping Evaluation

The resin composition was cast into a mold having a circular recess with an inner diameter of 15 mm and a thickness of 1 mm, and cured in an oven at 150° C. for 30 minutes to produce an acoustic matching layer molded article.

The appearance of the obtained acoustic matching layer molded article was visually observed, and the presence or absence of bubble trapping was evaluated. In the bubble trapping evaluation of Table 1, a case where bubble trapping was not confirmed is indicated as "A", and a case where bubble trapping was confirmed is indicated as "B".

Transmission Voltage

The transmission voltage of the acoustic matching layer molded article produced in the bubble trapping evaluation was measured using a pulser receiver ("5073PR", manufactured by Olympus Corporation) and a direct contact probe ("V127-RM", manufactured by Olympus Corporation).

The transmission voltage is an index of the acoustic characteristics of the acoustic matching layer, and it can be said that the larger the value, the smaller the transmission attenuation, which is preferable. In the evaluation in this example, when the transmission voltage is 10.0 V or more, it is determined that the acoustic characteristics are good.

TABLE 1

|  |  | Example | | | | | | Comparative Example | | |
|---|---|---|---|---|---|---|---|---|---|---|
|  |  | 1 | 2 | 3 | 4 | 5 | 6 | 1 | 2 | 3 |
| Resin composition | [part by mass] | | | | | | | | | |
| Resin | | | | | | | | | | |
| Epoxy resin (1) | | 75 | 75 | 75 | 75 | — | — | 75 | 75 | — |
| Epoxy resin (2) | | — | — | — | — | 75 | — | — | — | 75 |
| Epoxy resin (3) | | — | — | — | — | — | 75 | — | — | — |
| Curing agent | | 22 | 22 | 22 | 22 | 22 | 22 | 22 | 22 | 22 |

TABLE 1-continued

|  |  | Example | | | | | | Comparative Example | | |
| --- | --- | --- | --- | --- | --- | --- | --- | --- | --- | --- |
|  |  | 1 | 2 | 3 | 4 | 5 | 6 | 1 | 2 | 3 |
| Silane coupling agent |  | 3 | 3 | 3 | 3 | 3 | 3 | 3 | 3 | 3 |
| Hollow filler (glass balloon) |  | 29 | 29 | 29 | 29 | 29 | 29 | 29 | 29 | 29 |
| Thixotropy imparting agent |  |  |  |  |  |  |  |  |  |  |
| Hydrophilic silica (1) |  | 0.5 | — | 1.0 | 1.5 | 2.0 | 1.0 | — | 2.0 | 1.0 |
| Hydrophilic silica (2) |  | — | 0.5 | — | — | — | — | — | — | — |
| V0 (25° C., 0.3 rpm) | [Pa·s] | 1590 | 1900 | 1730 | 2290 | 1170 | 1570 | 1120 | 2830 | 742 |
| Dispersibility evaluation |  | A | A | A | A | A | A | B | A | B |
| Upper density | [g/cm³] | 0.64 | 0.64 | 0.64 | 0.64 | 0.63 | 0.63 | 0.61 | 0.64 | 0.61 |
| Lower density | [g/cm³] | 0.64 | 0.64 | 0.64 | 0.63 | 0.63 | 0.63 | 0.72 | 0.63 | 0.66 |
| Ti value (V1/V2) |  | 3.3 | 3.3 | 3.8 | 4.6 | 4.0 | 3.3 | 2.8 | 5.4 | — |
| V1 (50° C, 0.3 rpm) | [Pa·s] | 416 | 503 | 584 | 1038 | 573 | 424 | 243 | 1502 | — |
| V2 (50° C, 1.5 rpm) | [Pa·s] | 125 | 152 | 152 | 224 | 145 | 130 | 85.4 | 278 | — |
| Bubble trapping evaluation |  | A | A | A | A | A | A | A | B | — |
| Transmission voltage | [V] | 16.4 | 18.6 | 20.9 | 18.6 | 19.6 | 18.4 | 18.2 | 9.2 | — |

As can be seen from the results shown in Table 1, it was confirmed that by using a resin composition (Examples 1 to 6) having a predetermined viscosity at normal temperature and having a predetermined thixotropy at the time of molding, it was possible to maintain the compositional uniformity, suppress bubble trapping, and produce an acoustic matching layer molded article having good moldability and good acoustic characteristics.

In Comparative Examples 1 and 3, the hollow filler was floated in the dispersibility evaluation, and the evaluation results were poor. In Comparative Example 3, the viscosity (V1) and the viscosity (V2) were not measured, and molding using these resin compositions was not performed.

In addition, the resin composition of Comparative Example 2 had a large TI value, and when the resin composition was molded, bubble trapping was observed, the moldability was deteriorated, and the acoustic characteristics of the obtained acoustic matching layer molded article were also poor.

The invention claimed is:

1. A resin composition for an acoustic matching layer, comprising a resin, a hollow filler, and a thixotropy imparting agent, wherein the resin composition has a viscosity measured using a B-type viscometer with rotor No. 4 at a rotation speed of 0.3 rpm at 25° C. of 1130 to 4000 Pa·s, and has a thixotropy index expressed by the ratio (V1/V2) between a viscosity (V1) measured using a B-type viscometer with rotor No. 4 at a rotation speed of 0.3 rpm and a viscosity (V2) measured using a B-type viscometer with rotor No. 4 at a rotation speed of 1.5 rpm, at 50° C., of 3.0 to 5.0.

2. The resin composition for an acoustic matching layer according to claim 1, wherein the resin is a thermosetting resin, and the thermosetting resin has a viscosity measured using a B-type viscometer with rotor No. 4 at a rotation speed of 0.3 rpm at 25° C. of 2 to 50 Pa·s.

3. The resin composition for an acoustic matching layer according to claim 2, wherein the thermosetting resin is an epoxy resin.

4. The resin composition for an acoustic matching layer according to claim 1, wherein the thixotropy imparting agent is a powder having a BET specific surface area of 50 to 400 m²/g.

5. The resin composition for an acoustic matching layer according to claim 1, wherein the thixotropy imparting agent is a hydrophilic silica powder.

6. The resin composition for an acoustic matching layer according to claim 1, wherein the hollow filler has a particle diameter of 1 to 100 μm.

* * * * *